US 6,547,831 B1

(12) United States Patent
Kueny

(10) Patent No.: US 6,547,831 B1
(45) Date of Patent: Apr. 15, 2003

(54) METHOD OF GENERATING DOCUMENTS HAVING VARIABLE DATA FIELDS

(76) Inventor: Todd Kueny, 657 Hite Rd., PGH, PA (US) 15049

(*) Notice: Subject to any disclaimer, the term of this patent is extended or adjusted under 35 U.S.C. 154(b) by 0 days.

(21) Appl. No.: 09/320,524

(22) Filed: May 26, 1999

(51) Int. Cl.[7] ............................................. G06F 17/22
(52) U.S. Cl. ...................... 715/522; 715/524; 715/526
(58) Field of Search ................................. 707/522, 526, 707/524

(56) References Cited

U.S. PATENT DOCUMENTS 5,832,530 A * 11/1998 Paknad et al. ............... 707/500
6,209,010 B1 * 3/2001 Gauthier et al. ............. 345/620
6,252,677 B1 * 6/2001 Hawes et al. ............... 358/1.15
6,332,149 B1 * 12/2001 Warmus et al. ............. 707/515

OTHER PUBLICATIONS

Unknown, "BARCO Graphics VIP concept gives digital printing its true original dimension," http://www.barco.com/graphics/press/pri178ife.htm, (Jun. 8, 1998).

* cited by examiner

Primary Examiner—Heather R. Herndon
Assistant Examiner—Charles Bieneman
(74) Attorney, Agent, or Firm—Buchanan Ingersoll, PC

(57) ABSTRACT

Disclosed is a method of converting documents described by a stream of lexographic language statements to allow the use of variable data fields and variable symantic attributes, where the data used to control the contents and appearance of variable graphic elements of which the document is comprised may be stored external to the descriptive stream of language statements. This method can be used to create template documents described by the lexographic language stream.

14 Claims, 8 Drawing Sheets

```
BT
/F6 1 Tf
12 0 0 12 117 552.48 Tm
0 0 0 1 k
/GS2 gs
0 Tc
-0.0004 Tw
(Dear Nautical Enthusiast:) Tj
0 -2.4 TD
0 Tw
(Argo Research & Communications is pleased to inform you that you have been) Tj
0 -1.2 TD
(selected for inclusion in our study of Internet purchasing of marine and nautical) Tj
T*
(equipment.) Tj
0 -2.4 TD
[(W) 53 (e) 0 (hope you will take the time to fill out the survey section below and return it to) TJ
0 -1.2 TD
(us in the enclosed business reply envelope. This information will be used only to) Tj
T*
(improve the level of service you currently receive; this information will not be) Tj
T*
0.002 Tw
(disclosed to anyone else.) Tj
0 -2.4 TD
0 Tw
[(Thank Y) 50 (o) 6 (u) ] TJ
0 -1.2 TD
0.004 Tw
(Argo Research & Communications) Tj
T*
0.001 Tc
[(www) 61 (.argoresearch.com)] TJ
ET
```

FIG. 1

Dear Nautical Enthusiast:

Argo Research & Communications is pleased to inform you that you have been selected for inclusion in our study of Internet purchasing of marine and nautical equipment.

We hope you will take the time to fill out the survey section below and return it to us in the enclosed business reply envelope. This information will be used only to improve the level of service you currently receive; this information will not be disclosed to anyone else.

Thank You
Argo Research & Communications
www.agoresearch.com

FIG. 2

METHOD OF GENERATING DOCUMENTS HAVING VARIABLE DATA FIELDS

BACKGROUND

In commercial document production shops it is often necessary to render jobs containing large numbers of documents. Such rendering often presents complex problems: pieces may have multiple proportional fonts, non-trivial layout requirements, graphics and different color printing. Furthermore, the pieces produced must meet acceptable typographic standards. It is also desirable to be able to print pieces in large volumes typically measured in hundreds or thousands of pieces per hour. Such pieces must be designed for volume production in that individual pieces should not have to be individually crafted.

The printing of large volume jobs wherein documents containing variable data fields are being produced presents a problem in that, while tools exist which can create variable data field documents, no tool exists which is able to do so efficiently for jobs containing large numbers of documents.

Typically, such jobs are printed by having the variable data fields preprinted via a laser printer and having the remainder of the letter common to all copies done on an offset press. One problem with such a strategy is that the color of most laser printing is not an exact match for the color of the offset press, and second, there may be incompatibilities between the paper which needs to be used for that laser printing process and the paper which needs to be used for the offset process based on the ink used. Lastly, fonts used to print the variable data fields on a laser printer may not match the fonts used in the offset process and the relative positions of the laser preprinted variable portions of the letter may not line up in an exact way with the portions printed by the offset process.

It is therefore desirable that a tool be created which can handle print jobs in large volume having variable data fields. The Portable Document Format (PDF) language is useful for creating documents for rendering devices being driven by a PDF language interpreter. The PDF language, however, does not provide a facility for variable data fields. This invention provides the capability of adding variable data fields to a document specified in the PDF language. In addition, the capability of modifying the appearance of any given element, within the limitations of the PDF language, is provided.

SUMMARY OF THE INVENTION

A process is herein disclosed in which a document described by a stream of lexographic language statements can be made to have variable data fields as well as attributes which can be dynamically changed. The settings of the various attributes of the graphical elements which can be dynamically varied, and the variable data which is inserted in variable graphic elements may be contained in an outside data source.

A lexographic language is a structured, textual language providing the means to describe a graphic rendering process via text. To accomplish the objectives of this invention, it is first necessary to create a mapping of graphical elements of an image described by a stream of such lexographic language statements to the statements within the stream that created each element. A graphic element may be defined as, for example, a segment of text or a non-textual element. As the stream of lexographic language statements is sequentially read, a sequence of graphical states is kept which defines the attributes of the graphical elements to be displayed, as defined by the underlying lexographic language stream at any point within the stream. When a lexographic language statement is encountered which causes a graphic element to be displayed, a linking is created between the display of the graphic element, the current graphical state and the lexographic language statement which causes the display to occur.

Once this process has been completed for the entire file, the display of the output is marked up by a human. The marking includes the identification of those graphic elements which are to be variable, and also those graphic elements whose display attributes are going to be controlled by an outside data source, as well as the specification of which attributes are to be controlled. As an example, the salutation of a letter may be marked as being "variable," such that a list of persons to whom the letter is to be sent will generate a sequence of letters having the same body of text but a different salutation. Once the display of the letter is marked and the value for the attributes of the graphic elements are known, the data which controls the appearance of the graphic elements according to the attributes is merged into an output stream which creates a sequence of documents identical to the original document, except for the marked graphic elements.

During the merge step, sets of data values are read from an outside data source which correspond to the attributes defined for any given graphical element. For example, if a graphical text element is defined as being variable, then a text segment is read from a data file and applied to the graphic element. In order to accomplish the change from the original graphical element to the new graphical element, a set of modifications to the original stream of lexographic language characters is defined. This is known as a transformation. By applying the transformations to the original stream, an output stream of lexographic language statements is created based on the set of data read. For each set of data, a new stream substantially identical to the original stream, but for the transformations, is created.

DESCRIPTION OF THE DRAWINGS

FIG. 1 shows a typical stream of lexographic language statements

FIG. 2 shows a rendering of stream of lexographic language statements of FIG. 1.

DETAILED DESCRIPTION OF THE INVENTION

Lexographic languages, such as PDF, are of a form which is inefficient for a human to use unless the statements of the language are processed to create a graphical image. A sample of a stream of PDF lexographic language is shown in FIG. 1 as reference number 2. FIG. 2 shows how the PDF statements of FIG. 1 are displayed when properly interpreted. To add the capabilities of variable data fields to a document, the statements of the lexographic language must be manipulated. As a result, once the overall image is created from a lexographic description there must be a way to link the graphic elements of the overall image back to the appropriate language statement or statements in the description so that a human may indirectly manipulate the underlying lexographic stream by manipulating the graphic elements of the image.

Figure 3:
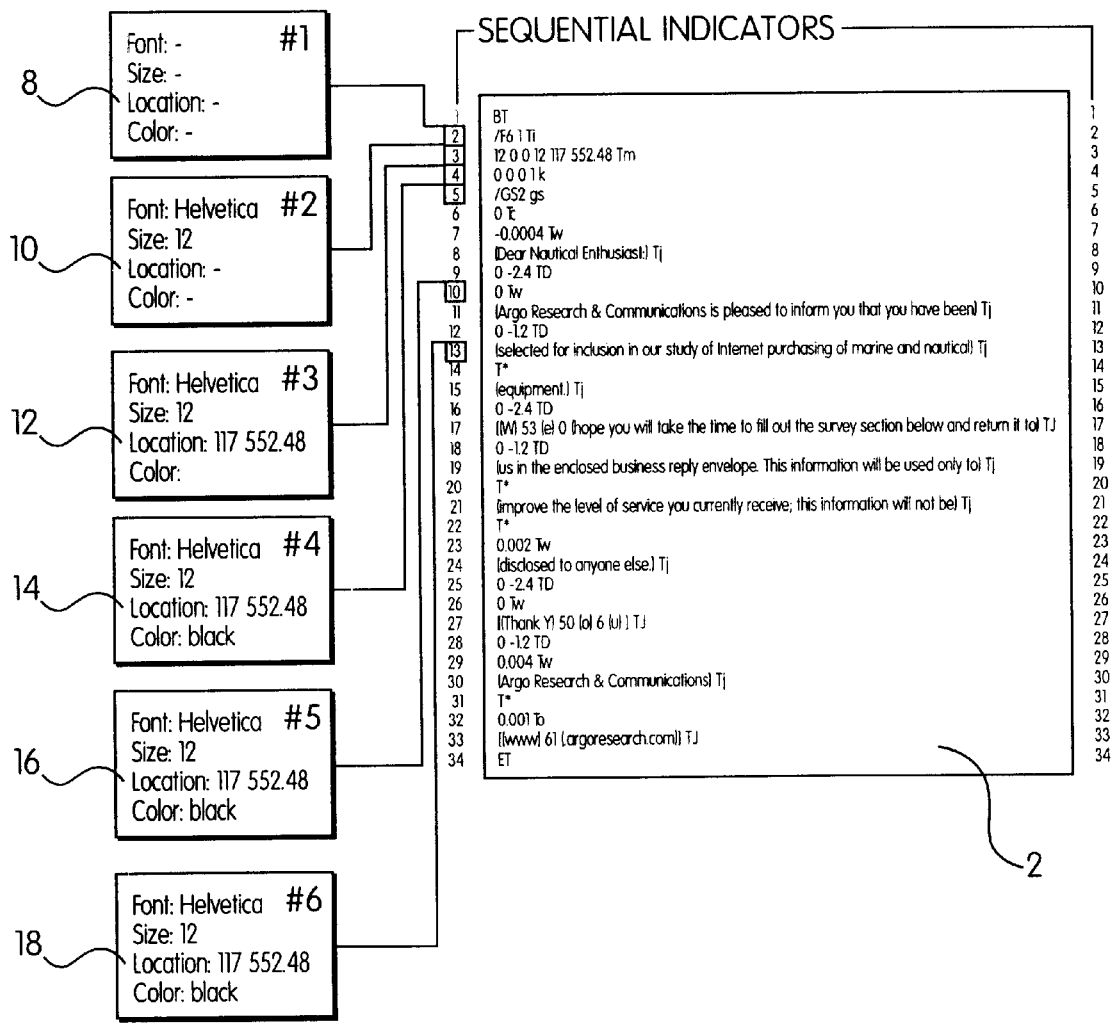
FIG. 3 shows a series of data structures containing the graphical states of the document of FIG. 1 at various times.
Figure 4:
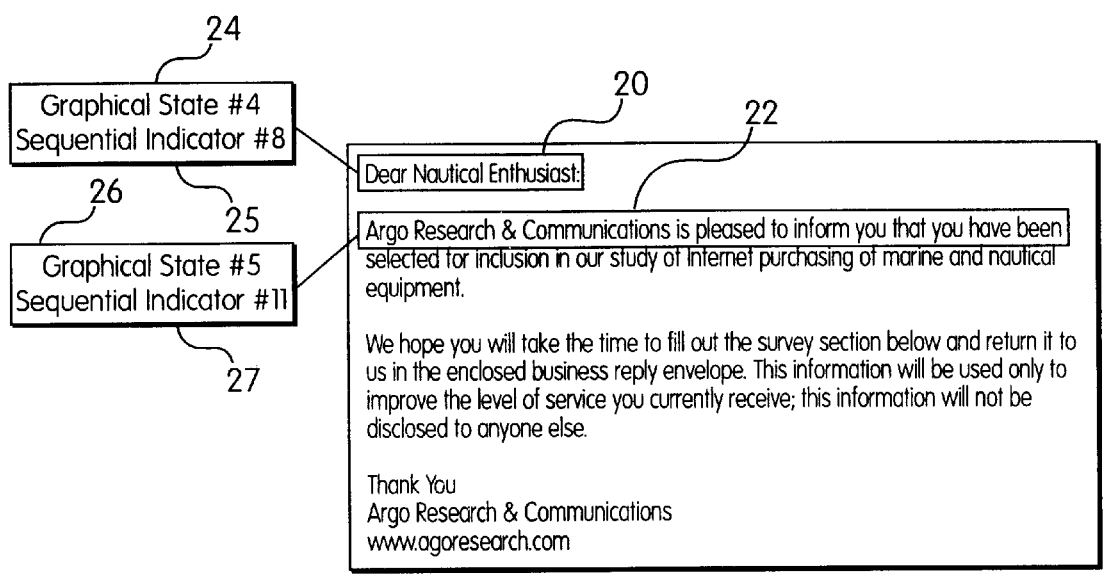
FIG. 4 shows the linking between graphic elements, graphic state and language statements.

In order to prepare a document for the addition of variable data fields, a process is undertaken in which each graphic element, which may be, for example, a segment of text, composing the overall image is mapped back to the corresponding lexographic language statement or statements which created or affected the appearance of that graphic element, and also to a "graphic state" that was current at the time the lexographic language statement was encountered. The graphic state holds a series of one or more variables, where each variable corresponds to a symantic element (or a component thereof) within the lexographic language that controls the appearance of the graphic element. For example, a variable may hold the current font size used when rendering text. An example of the graphical states created for the PDF language statements of FIG. 1 is shown in FIG. 3 as 8, 10, 12, 14, 16 and 18. The linking of the graphic elements of the displayed image to the graphic states shown in FIG. 3 is shown in FIG. 4. The mapping for graphic element 20, which is a segment of text, shows a link 24 to graphic state #4, shown as 14 on FIG. 3, and also a link 25 to sequential indicator 8, also shown on FIG. 3, which indicates that the lexographic language statement which created the graphical element is the eighth lexographic language statement in the input stream 2. Likewise, graphic element 22 is mapped to links 26 and 27, indicating graphical state 5 and sequential indicator 11 respectively.

Figure 5:
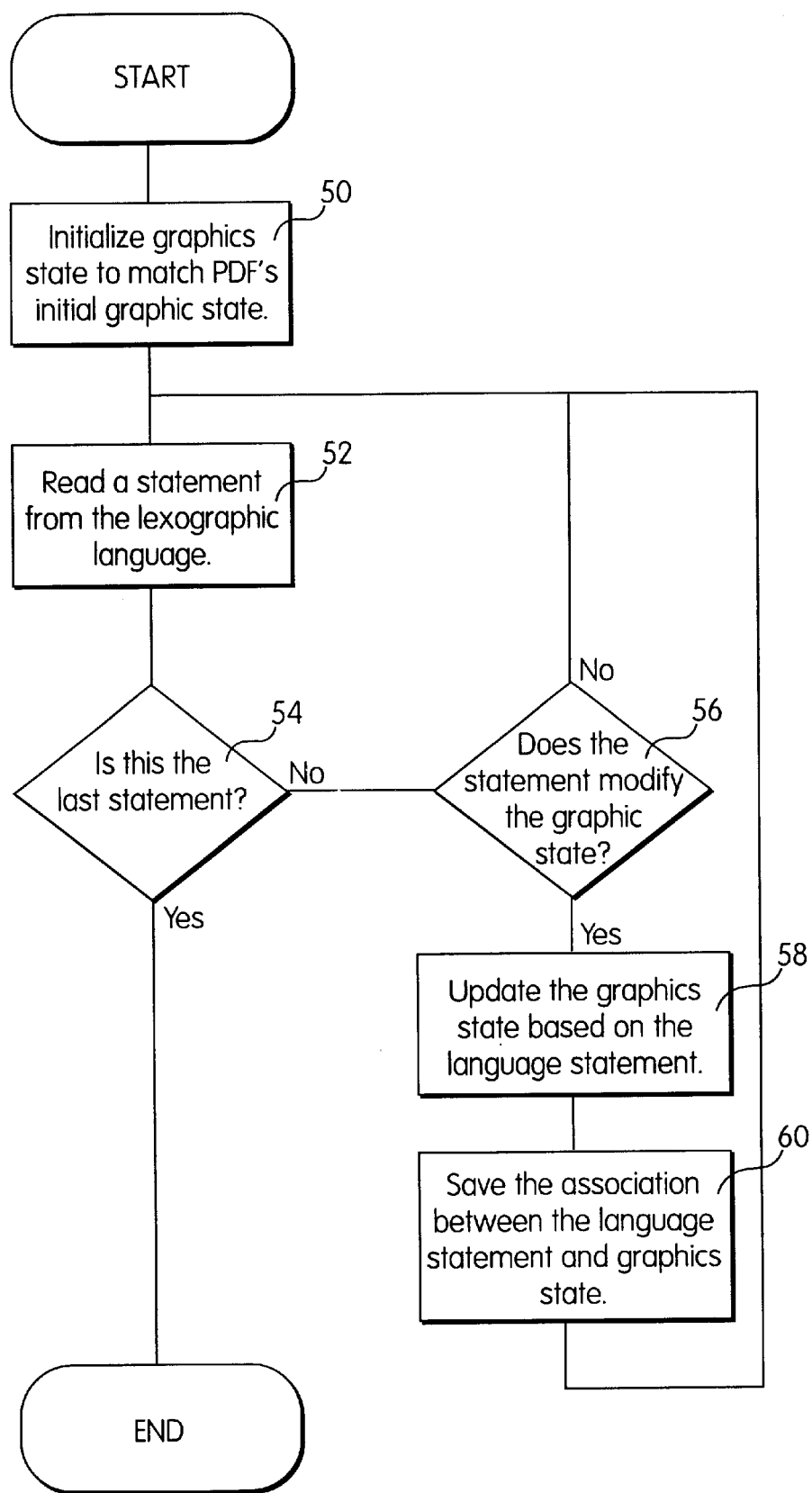
FIG. 5 is a flow chart showing the building of the graphic state data structures.

The process used to map graphic elements to graphic states and sequential lexographic language statement indicators is shown in flow chart form in FIG. 5. In step 50, the graphics state is first initialized to match the initial settings of the underlying lexographic language. In step 52, the statements of the underlying lexographic language defining the overall image are then inspected one at a time in the order defined by the language, until the last statement is read at step 54. At step 56, a check is made to see if the graphic state has been modified by the last statement. If so, the graphic state is updated at step 58, and, at step 60, a link is created between the updated graphic state and the language statement which caused the change in the graphic state. The language statement and the graphic state as it is defined at that point of the inspection process is saved so that it is uniquely identified. The process of saving this state must allow for 1) the retrieval of the saved state information by its location in the lexographic language stream, and 2) for the retrieval of the saved state information by the location and/or appearance of the graphic element within the graphical image. As a practical matter, it is only necessary to save the state when a statement of the underlying lexographic language modifies one or more of the variables stored in the state. As a result, multiple graphic elements may be linked to the same state.

When this process is complete, any graphic element contained in the overall image can be tied to specific point in the underlying lexographic description, as defined by a stored state and linking to the specific lexographic language statement responsible for displaying the graphical element.

Figure 6:
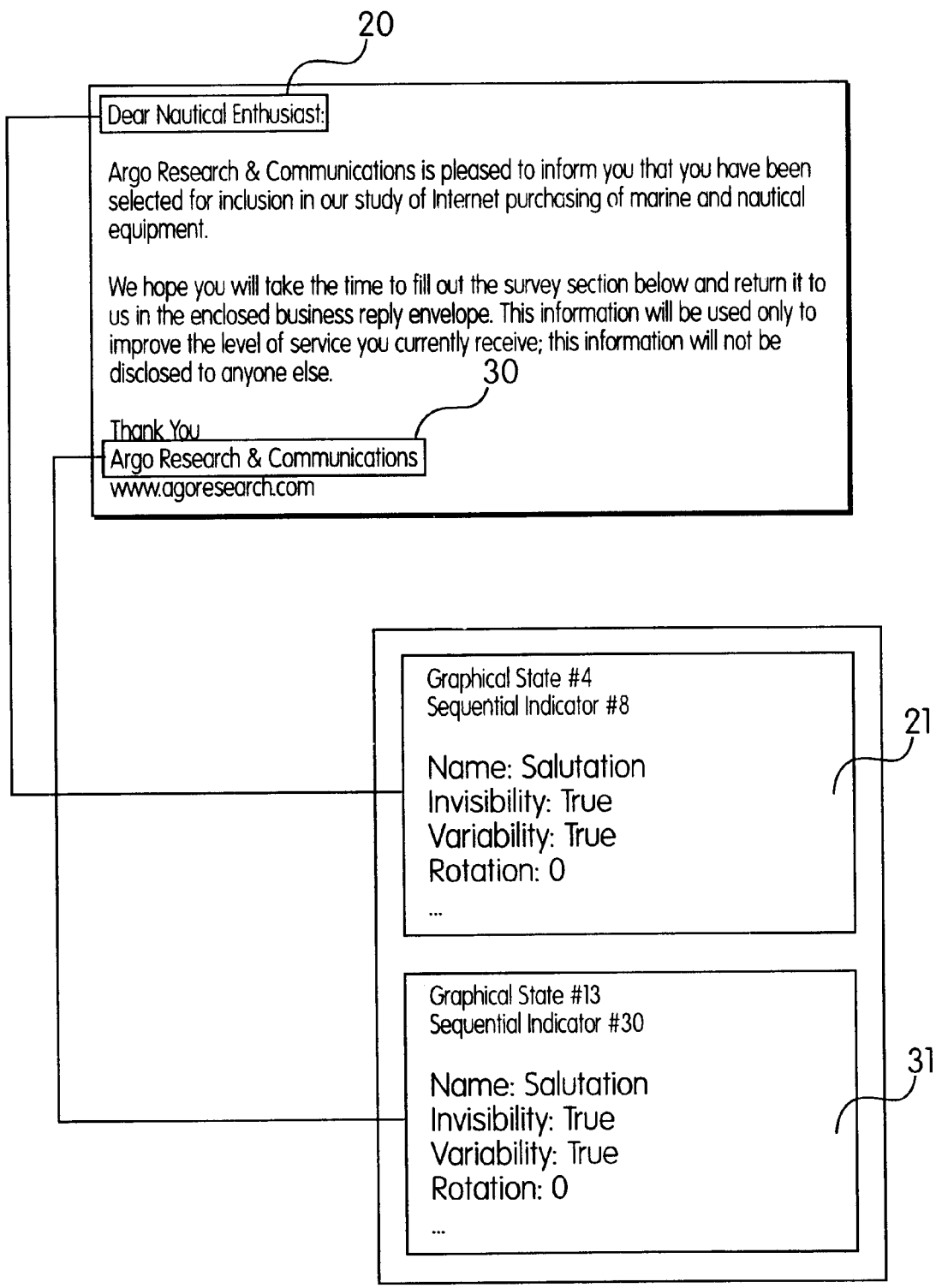
FIG. 6 shows attributes defined for each marked graphic element on the original image

A set of attributes is defined that will affect how graphic elements may be manipulated. These attributes must be defined such that the effect of modifying an attribute can be accomplished by manipulating the underlying lexographic language statements. As an example, FIG. 6 shows attribute sets 21 and 31 for graphic text elements 20 and 30, respectively. The attributes of invisibility, variability and rotation are defined for each of graphical text elements 20 and 30.

Figure 7:
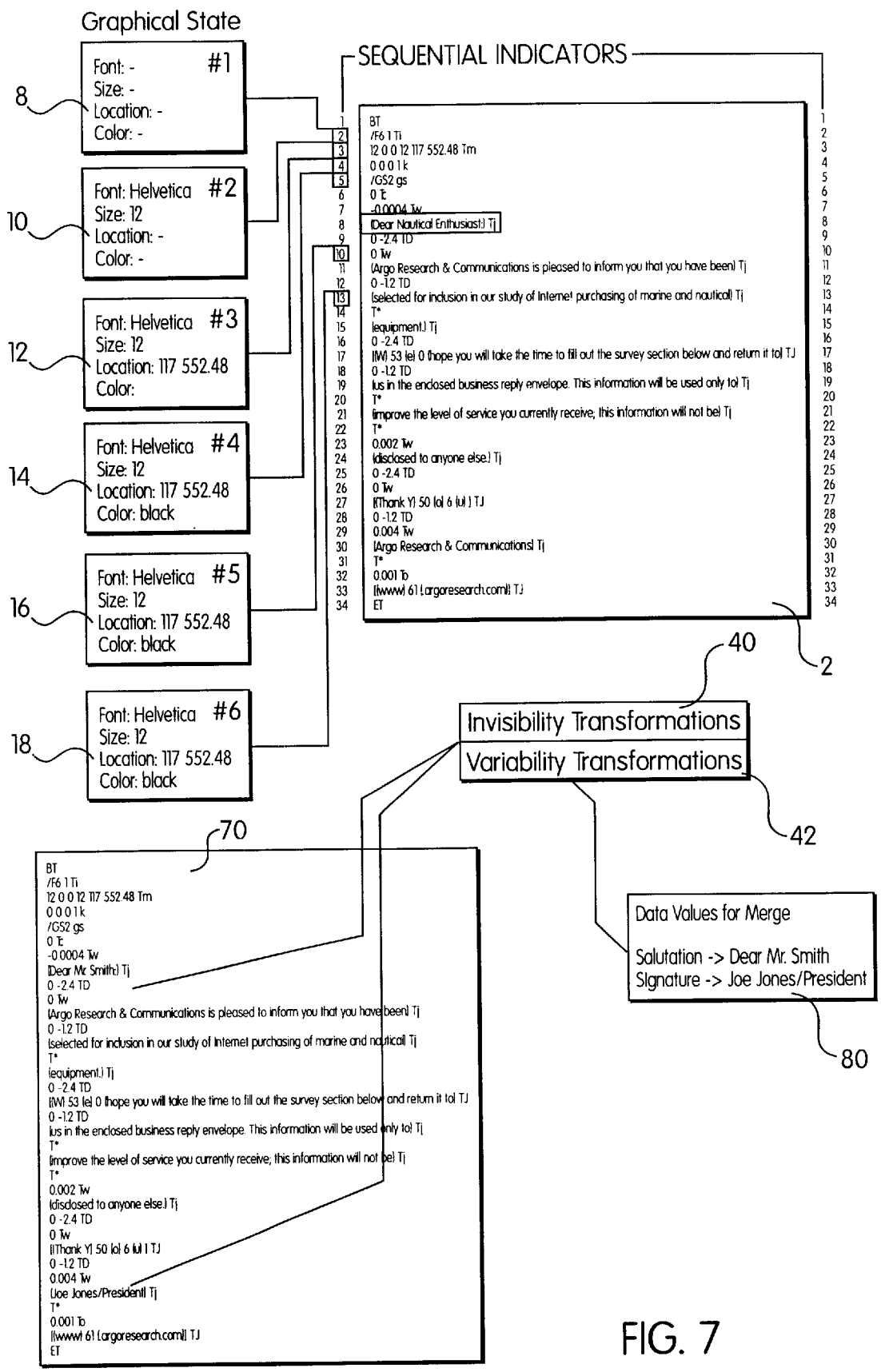
FIG. 7 is a block diagram showing the integration of data and the original document to form a new document via transformations.

For each attribute a set of appropriate transformations is defined that will be applied to the underlying lexographic language statements so that the indicated effect can be achieved. FIG. 7 shows transformations 40 and 42 in block diagram format, for the invisibility and variability attributes, respectively, of the graphical text elements. The transformation is a sequence of editing operations that may be applied to the original lexographic language stream to achieve the desired change. The editing operations may include, but are not limited to, modifying, adding or deleting underlying lexographic language statements.

Figure 8A:
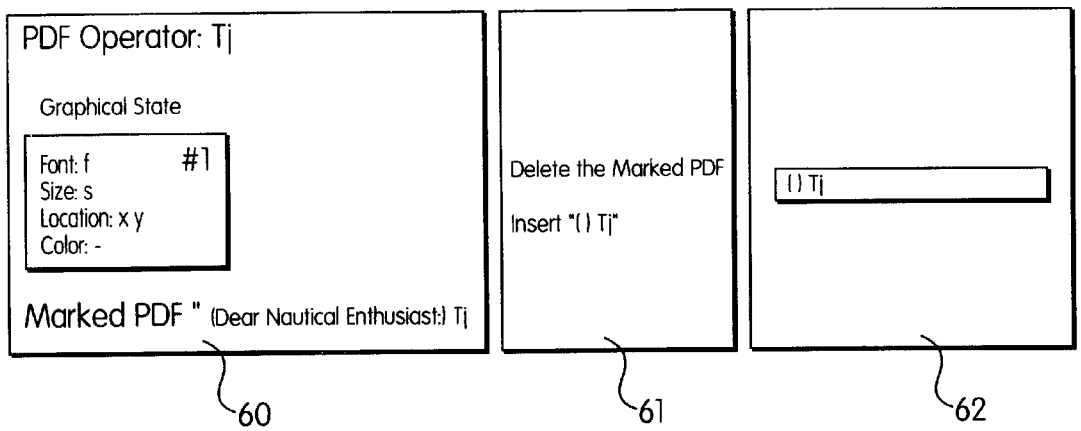
FIG. 8a shows various details of an invisibility transformation

For example, the attributes invisibility, rotation and variability have been defined for graphic text elements. The transformation for textual invisibility, shown in FIG. 8a, could be implemented by replacing the underlying lexographic language statement which displays the text with a statement or statements having non-printing characters, or, alternatively, deleting the statement responsible for displaying the text. The inputs necessary to perform the invisibility transform are shown in box 60 in FIG. 8a. It is necessary to know which statement in the original stream of lexographic language statements is to be transformed, as well as what the graphic state was at the time that language statement was encountered. In this example, the PDF statement "(Dear Nautical Enthusiast) Tj" is being transformed to make it invisible when the entire stream is displayed by an interpreter. To accomplish this, the steps shown in box 61 are carried out. First, the original Lexographic statement is deleted, then a new statement having no text (i.e., "( ) Tj") is inserted. The original marked PDF statement is thus replaced by the PDF statement shown in box 62.

Figure 8B:
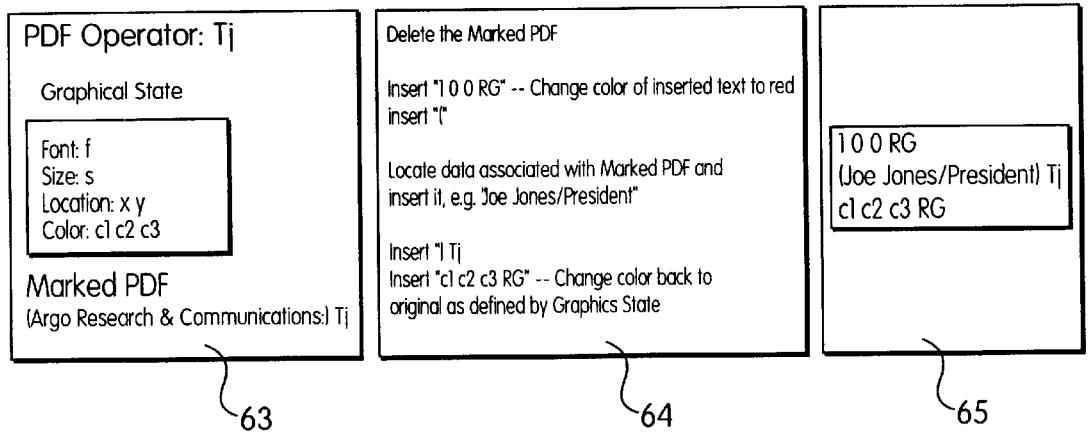
FIG. 8b shows various details of a variability transformation

A variability transformation is shown in FIG. 8b. In this case, the PDF statement "(Argo Research & Communications) Tj" shown in box 63, is to be made variable. Thus, when the merge process, described below, is carried out, text read from a database will be substituted for the original text. In this transformation, the color of the substituted text is to be displayed in red. The steps to carry out this transformation are shown in box 64. First, the original PDF statement is deleted. Next, a PDF statement is generated to change the color of the displayed text to red (i.e., "1 0 0 RG"). The text to be displayed is then located and retrieved. The text may be stored in a database, or by utilizing any method commonly known to those of ordinary skill in the art. Once the text is retrieved, a PDF statement is generated to display the text (i.e., "(Joe Jones/President) Tj"). Lastly, a PDF command is generated to change the color back to whatever it was prior to the application of the transformation (i.e., "c1 c2 c3 RG"). The previous color information is retrieved from the graphical state, shown in box 63. The original color is expressed, in this case, as three variables, c1, c2 and c3. The value of these variables will determine the actual color that in which the remainder of the text is to be displayed. Box 65 shows the PDF statements that are substituted for the original marked PDF statement.

Figure 9:
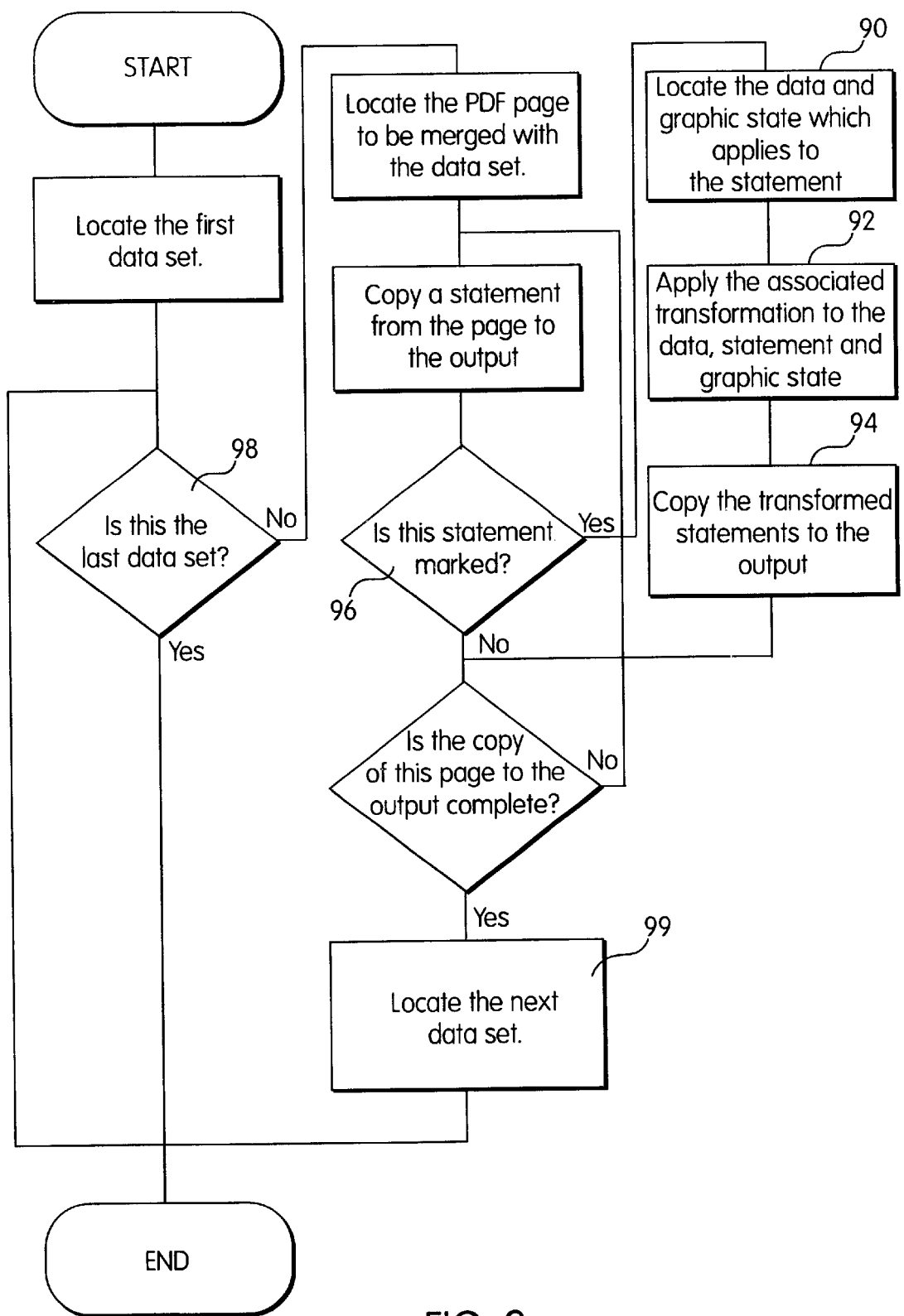
FIG. 9 is a flow chart showing the process by which external data is merged with the original document.

The merge process is shown in flow chart form in FIG. 9 and schematically in FIG. 7. The process involves reading data 80 from a source external the lexographic language stream and applying the data to the graphic elements via the transformations. As stated above, the attributes define how graphic elements may be manipulated, based on the data.

For an image having specific graphic elements identified as having attributes that are to be modified, a set of links is identified between the attributes of the graphic elements and a set of one more data values 80. This linkage is defined such that data values control specific attributes for the graphic elements of the image. As previously stated, the data may be stored in any manner commonly known to those skilled in the art, such as in a database or in a delimited ASCII text file.

For each set of data values, an output stream of lexographic language statements 70 is generated, based on the original input stream 2. This is accomplished by sequentially copying the ordered lexographic language statements from the original input stream 2 to the output stream 70. As shown in step 96 on FIG. 9, when an element is encountered which has one or more attributes linked to the set of data elements, (i.e., is "marked") the set of data elements is inspected to determine what, if any, transformations should be applied to modify the appearance of the elements from the appearance stored in the graphic state at that point in the lexographic language stream. If the value of the attributes or the data indicates a transformation should be applied, the result of the transformation process, i.e., a modification, addition, or deletion of the underlying lexographic language statements, is generated. If the data indicates that a transformation should not be applied, the original lexographic language stream is copied unchanged to the output. This process is shown in steps 90, 92 and 94 on FIG. 9.

As an example, suppose there is an image which is marked to contain three graphic text elements with a variable attribute and another text element having an invisibility attribute. Each of the three variable text elements could be linked to fields in a database such that the contents of the database will replace the text of the original element, via the transformation defined for variability, shown in FIG. 8b. Similarly, a specific data value of a specific field in the database could be defined to control whether or not the invisibility attribute is applied to the other text element, via the transformation shown in FIG. 8a.

A plurality of copies of the original stream of lexographic language statements may thereby be generated by copying the original stream and applying the appropriate transformations, as required by each set of data values. As shown in steps 98 and 99 of FIG. 9, each data set is read one at a time, and the process described above is carried out using the current data set. The result is an output stream of lexographic language statements 70 describing a plurality of copies of the original document, each customized according to a particular set of data values. This output stream of lexographic language statements may then be sent to an interpreter capable of understanding the lexographic language statements and driving a printer or other rendering device, based on the interpretation thereof. In the preferred embodiment of the invention, the underlying lexographic language is PDF, however, any such language may be employed.

Although the invention has been described in terms of a printed document, it is not intended to be limited to documents that can only be rendered by a printer. The elements comprising the entire document could be defined, for example, as audio or video elements, or any other type of element that can be perceived by a human when rendered by an appropriate rendering device. An example of such an application would be a form letter that is to be distributed via e-mail, where a computer having a video display and speakers would serve as the rendering device. In such a scenario, a video element could be customized by various attributes, such as volume and variability, such that when the e-mail is viewed, a custom audio message, such as "Hello Mr. Smith" is played for each recipient.

The present invention also includes several optimizations to enhance the efficiency of the rendering of the output lexographic language stream. The first of these involves identifying within the lexographic language stream a sequence of two or more statements not having associated variables. That is, a sequence of statements that will not be altered or transformed in the merging step described above, and which are copied verbatim from the original lexographic language stream to the output lexographic language stream. When such a sequence of statements is discovered, the sequence is stored and a reference to the stored sequence is generated. When the output language stream is generated, the reference to the stored sequence of statements is substituted in the output lexographic language stream for the actual sequence of statements.

Likewise, the second optimization utilizes the technique disclosed in the above paragraph applied to the data that is inserted in the output language stream during the merge process. If it is determined that the same data will be inserted multiple times, this data can be stored and a reference to the data created. When it is determined that the data is required for a given graphical element, the reference to the data is substituted in the output lexographic language stream for the actual data.

A second group of optimizations is dependent upon the use of a rendering device which is capable of storing and managing information which can be access by reference during the rendering of the output lexographic language stream. These optimizations are applied after the optimizations discussed above involving sequences of statements and shared data have already been applied.

First, the output lexographic language stream is analyzed to see if there is a significant number of either stored sequences or stored shared data which will require transmission to the rendering device. When such an instance is detected, the stored sequence or stored shared data is retained in the rendering device the first time it is transmitted. A transformation is then applied to the output lexographic language stream to substitute an instruction to the rendering device to output a particular stored run or shared data in lieu of having the stored data re-transmitted to the rendering device. This avoids multiple transmission of the same data to the rendering device.

A more sophisticated version of this optimization is applied when it is determined that the rendering device may not be capable of storing all of the stored sequences and stored shared data which is contained in the output lexographic language stream. In this case, a caching process is used to determine the best method of selecting which data should be stored in the rendering device and when the data should be stored during the output process. First, the total capacity of available storage in the rendering device is determined. Next, the output lexographic language stream is inspected in order to determine the size and frequency of use by the remainder of the lexographic language stream for each stored sequence and stored shared data. If a stored sequence or shared data which is larger than the storage of the rendering device is encountered, it is ignored. Next, the output lexographic language stream is inspected in order and a running total of the storage required by the stored sequences and stored shared data is kept. At each point where the running total size exceeds the size of the available storage in the rendering device, instructions are generated to either 1) cause sequences or shared data to be removed from the storage of the rendering device, or 2) cause sequences or shared data not to be stored in the storage of the rendering device. A variety of mathematical caching algorithms known to those of ordinary skill in the art exists to define the most efficient method of performing the caching.

It will be understood by those skilled in the field that modifications may be made to the disclosed embodiments without departing from the scope of the invention, which is defined by the appended claims, including all equivalents thereof.

I claim:

1. A method comprising the steps of:

reading a sequential stream of language statements used to produce a graphical image comprising a plurality of graphical elements;

creating a graphic state containing a set of variables when one of said language statements specifies a new value for one or more of said variables, said variables being used to specify the appearance of said graphical elements;

saving said created graphic state;

mapping each of said graphical elements to one of said graphic states; and maintaining a link between each of said graphic states and one or more of said language statements, such that said links can be used to modify said language statements.

2. The method of claim 1 wherein said one or more of said language statements specifies the value of one or more of said variables in said graphic state.

3. The method of claim 1 further comprising the steps of:

identifying said graphical states mapped to one or more of said graphical elements to be modified; and defining a set of edits, based on said mapped graphic states, to be applied to said sequential stream of language statements to modify said graphical elements.

4. The method of claim 3 further comprising the steps of:

linking said graphical elements to be modified to a plurality of sets of data values; and generating, for each one of said sets of data values, a second sequential stream of language statements, using said data values in said set and said set of edits, to produce a series of modified graphical images.

5. The method of claim 4 further comprising the step of:

transmitting said second sequential stream of language statements to a rendering device for rendering of said modified graphical images.

6. The method of claim 4 further comprising the step of:

transmitting said second sequential stream of language statements to an interpreter capable of interpreting said language statements and generating instructions to a rendering device for rendering of said modified graphical images.

7. The method of claim 4 further comprising the steps of:

identifying sequences of language statements not having edits to be applied thereto;

storing said sequences of language statements;

creating references to said stored sequences of language statements; and replacing all instances of said-stored sequence of language statements in said second stream of language statements with said reference.

8. The method of claim 7 wherein said sequences of language statements are stored in a rendering device.

9. The method of claim 7 further comprising the steps of:

determining, in a rendering device having storage, the total capacity of said storage;

analyzing said second stream of language statements to determine the size and frequency of use of all stored sequences of language statements; and caching said sequences of language statements in said storage of said rendering device based on size and frequency of use.

10. The method of claim 7 further comprising the steps of:

determining, in a rendering device having storage, the total capacity of said storage;

analyzing said second stream of language statements to determine the size and frequency of use of all stored data values; and caching said stored data values in said storage of said rendering device based on size and frequency of use.

11. The method of claim 4 further comprising the steps of:

identifying data values common to multiple sets of data values;

storing said common data values;

creating references to said stored data values; and replacing all instances of said stored data values in said second stream of language statements with said reference.

12. The method of claim 11 wherein said common data values are stored in a rendering device.

13. The method of claim 1 wherein said stream of language statements conforms to the Portable Documents Format (PDF) standard.

14. The method of claim 1 wherein said stream of language statements conforms to the Postscript standard.

* * * * *